July 24, 1923.
J. J. McCONNELL
BAKING FRAME
Filed April 18, 1922
1,463,124
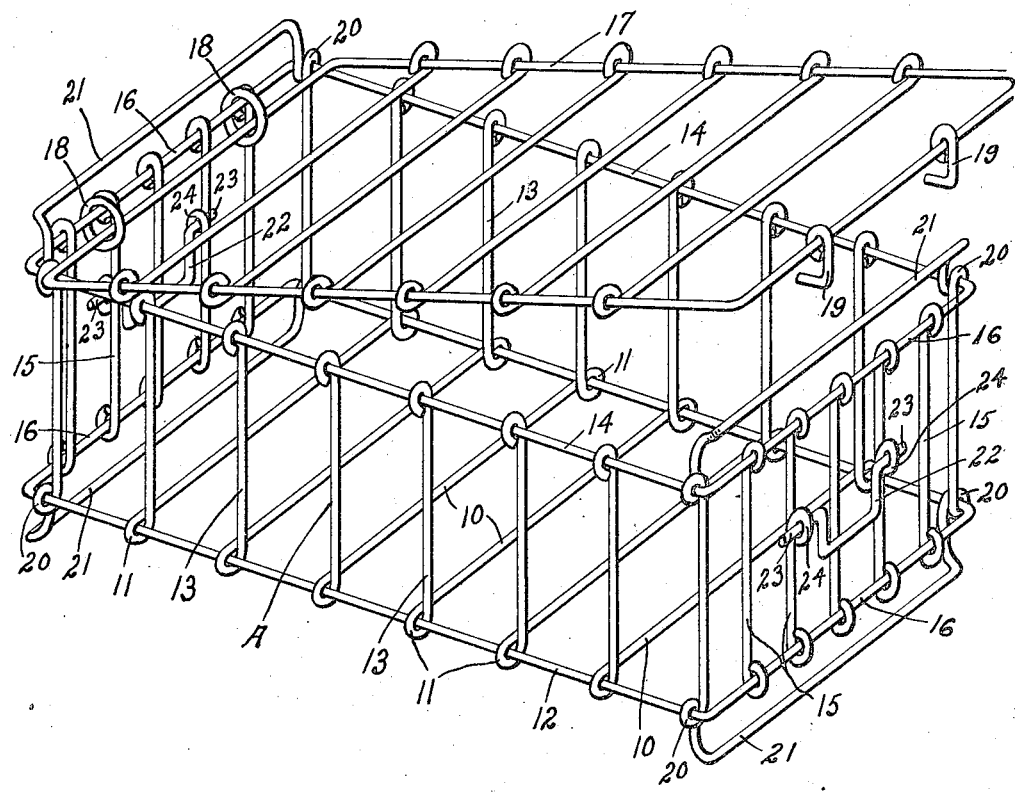
John J. McConnell.
INVENTOR
BY *Victor J. Evans*
ATTORNEY Patented July 24, 1923.

1,463,124

UNITED STATES PATENT OFFICE.

JOHN J. McCONNELL, OF ROCKFORD, ILLINOIS.

BAKING FRAME.

Application filed April 18, 1922. Serial No. 554,593.

*To all whom it may concern:*

Be it known that I, JOHN J. MCCONNELL, a citizen of the United States, residing at Rockford, in the county of Winnebago and State of Illinois, have invented new and useful Improvements in Baking Frames, of which the following is a specification.

This invention relates to cooking utensils, and contemplates the provision of a basket primarily designed for baking potatoes, the basket being constructed so that it can be conveniently handled and arranged within the oven, with either the top or bottom uppermost and easily reversed from time to time in order that the contents can be properly baked in quick order.

The nature and advantages of the invention will be better understood when the following detailed description is read in connection with the accompanying drawing, the invention residing in the construction, combination, and arrangement of parts as claimed.

The figure in the drawing illustrates a perspective view of the basket forming the subject matter of the invention.

Referring to the drawing in detail, A indicates generally a basket which is constructed from wire, and which may vary in size and configuration without departing from the spirit of the invention, the basket as above stated, being primarily designed for the purpose of baking potatoes therein. As shown in this specific instance, the basket is of elongated formation and includes a bottom 10 made up of a plurality of transversely disposed strands of wire which are looped as at 11 about a base frame 12 and then extended forwardly as at 13 to provide the sides of the basket. The extensions 13 are then looped about a frame 15 of similar configuration as the frame 11. The basket also includes end walls which are made up of the spaced wire strands 15 which are looped about the corresponding portions 16 of the spaced frames 11 and 14 respectively. The basket is provided with a cover 17 which is hingedly associated with the frame 14 at one end thereof by means of rings 18, while the opposite end of the cover carries suitable clamps or fastening elements 19 which are adapted to engage the opposite end of the frame 14 to hold the cover immovable in a closed position. This cover is also constructed of wire in the manner illustrated. It will be noted that the two outermost strands 15 of each end wall of the basket is looped as at 20 about the frames 11 and 14 respectively at the corners thereof, and then extended transversely of the basket as at 21 both above and below the basket and these transverse members 21 constitute supports upon which the basket reposes when arranged within the oven so as to space the basket from the bottom of the oven as will be readily understood. The construction is such that the basket may be arranged within the oven with either the bottom or top uppermost and that the basket can be reversed from time to time so that the contents of the basket can be properly and well baked in a minimum of time. For the purpose of conveniently handling the basket in this manner as well as for carrying it from place to place, I provide each end of the basket with a handle 22. Each handle is formed from a single strand of wire having offset extremities 23 which are passed through eyes 24 which are formed by said elements 15 of each end wall, at suitable points in their length. The construction of the basket is very simple and particularly useful for the purpose intended.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

1. A cooking utensil of the character described comprising a wire basket including opposed sides and end walls, a cover hinged upon one end wall, means carried by the cover for engaging the opposite end wall for holding the cover in its closed position, and the wire forming the outline of said end walls being extended above and below the basket and transversely thereof to provide supports, whereby the basket can be supported with either its bottom or top uppermost for the purpose specified.

2. A cooking utensil of the character described comprising a wire basket, said basket including opposed sides and end walls, and a cover hinged upon one end wall, means carried by the cover and designed to engage the other end wall for holding the cover in its closed position, the wire forming the outline of the end walls being extended above and below each wall and transversely of the basket, to provide supports whereby the basket can be arranged with either the bottom or top uppermost, spaced loops formed on each end wall, and a handle associated with each end wall and including offset terminals received by said loops.

In testimony whereof I affix my signature.

JOHN J. McCONNELL.